Patented July 13, 1926.

1,592,604

UNITED STATES PATENT OFFICE.

AUGUST LEOPOLD LASKA AND ARTHUR ZITSCHER, OF OFFENBACH-ON-THE-MAIN, GERMANY, ASSIGNORS TO THE CORPORATION OF CHEMISCHE FABRIK GRIESHEIM-ELECTRON, OF FRANKFORT-ON-THE-MAIN, GERMANY.

BLACK DISAZO COTTON DYE.

No Drawing. Application filed April 2, 1924, Serial No. 703,747, and in Germany April 17, 1923.

In our U. S. Patent No. 1,452,083 dated April 17, 1923, we have described black azo-dyestuffs, which are formed by combining the diazocompound of an aryl-azo-1-naphthylamin compound (not containing a sulfo group) with an arylamid of 2.3-hydroxynaphthoic acid.

Now we have found, that valuable black azodyestuffs yielding, when mixed with the usual substrata, black pigment colors and, when produced on the fiber, dyeing cotton in black shades of an excellent fastness are obtained by combining the diazocompounds of unsulfonated aryl-azo-1-naphthylamin bodies, containing basic groups in one or several lateral chains either in the aryl or in the naphthalene residue or in both, with arylamids of 2.3-hydroxynaphthoic acid.

When referring above to "the usual substrata" we mean substrata, such as barium sulfate or aluminum hydroxide, which are customarily employed in the production of pigment colors.

These dyestuffs probably have the general formula:

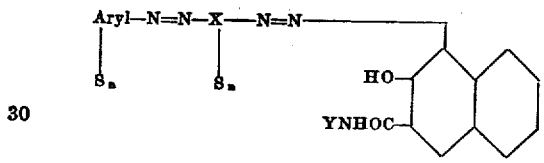

wherein S means a basic group such as

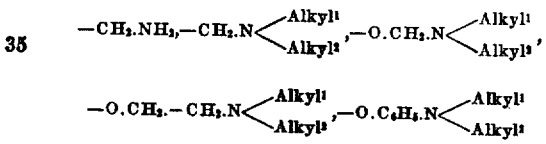

$n$ the number 0, 1 or 2, but not 0 in both positions simultaneously, X the residue of an 1-naphthylamin compound capable of combining in the 4-position and not containing a sulfo group, Y an aromatic radical. These dyestuffs are when dry black powders, yielding upon reduction with stannous chlorid an arylamin containing 0 to 2 basic groups in lateral chains, an 1.4-diaminocompound of the naphthalene series, containing 0 to 2 basic groups in lateral chains, and an arylid of 1-amino-2-hydroxy-3-naphthoic acid.

The presence of a basic group in external binding works advantageously upon the solubility of the diazocompounds, so that by means of the above mentioned aminoazo-compounds the preparation of stronger concentrated solutions, as are used for adding subsequently to the developing-baths, is really facilitated.

The following example illustrates the invention, the parts being by weight.

Example.

The cotton yarn, well boiled and dried, is impregnated with a solution of 4 gr. of β-naphthalid of 2.3-hydroxynaphthoic acid, 15 cc. of caustic soda solution of 34° Bé. and 20 cc. of Turkey red oil per liter, wrung out as well as possible and developed without drying in a diazo solution, containing 6.5 g. of the aminoazo body from diazotized 4-aminobenzyldimethylamin and 1-naphthylamin per liter, to which sodium acetate has been added, rinsed and soaped.

In this manner bluish black shades of an excellent fastness are obtained. The dyestuff thus produced probably has the following formula:

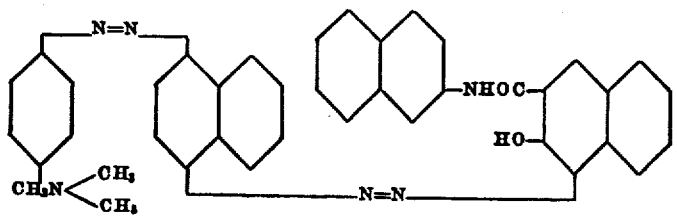

With other corresponding aryl-azo-1-naphthylamin bodies and other arylamids of 2.3-hydroxynaphthoic acid the process may be conducted in the same manner.

The following table gives the shades of a number of dyestuffs, prepared according to the present process:

| Diazo compound of the aminoazo body from— | Combined with the arylid of 2.3-hydroxynaphtholic acid. | Shades. |
|---|---|---|
| 1. 4-aminobenzyldimethylamin + α-naphthylamin | Anilid | Bluish black. |
| 2. Do. (Example.) | β-naphthalid | Do. |
| 3. Do. | Para-anisidid | Do. |
| 4. Do. | Meta-chloroanilid | Reddish black. |
| 5. 4-amino-ω-dimethylaminophenethol+α-naphthylamin. | Meta-nitroanilid | Bluish black. |
| 6. Do. | β-naphthalid | Do. |
| 7. Do. | Meta-chloroanilid | Violet-black. |
| 8. 2-aminobenzyldimethylamin+α-naphthylamin. | Meta-nitroanilid | Do. |

| Diazo compound of the aminoazo body from— | Combined with the arylid of 2.3-hydroxynaphtholic acid. | Shades. |
|---|---|---|
| 9. 2-aminobenzyl dimethylamin+α-naphthylamin. | β-naphthalid | Deeply black. |
| 10. Do. | Meta-chloroanilid | Bluish black. |
| 11. Do. | Para-chloroanilid | Violet-black. |
| 12. Do. | 2.3-hydroxynaphthoyl-5-chloro-1.2-anisidin. | Reddish black. |
| 13. 4-aminobenzylpiperidin+α-naphthylamin. | Meta-nitroanilid | Violet-black. |
| 14. Do. | β-naphthalid | Bluish black. |
| 15. Do. | Para-toluidid | Do. |
| 16. Do. | Para-phenetidid | Violet-black. |
| 17. Do. | Meta-chloroanilid | Bluish black. |
| 18. Do. | Para-chloroanilid | Do. |

The final dye enumerated above under 4 probably has the following formula:

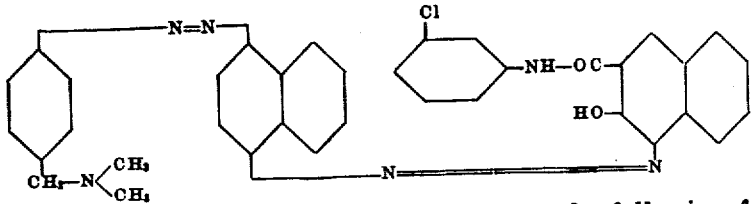

The final dye enumerated above under 6 probably has the following formula:

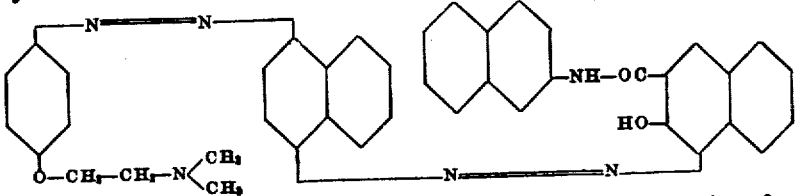

The final dye enumerated above under 12 probably has the following formula:

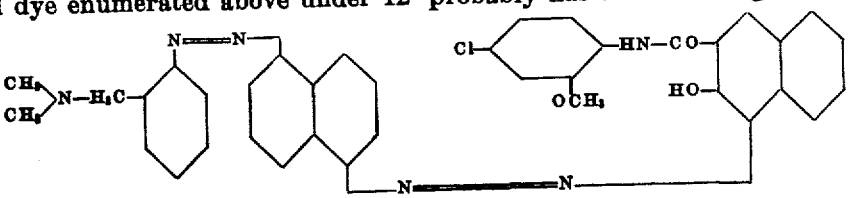

The final dye enumerated above under 16 probably has the formula:

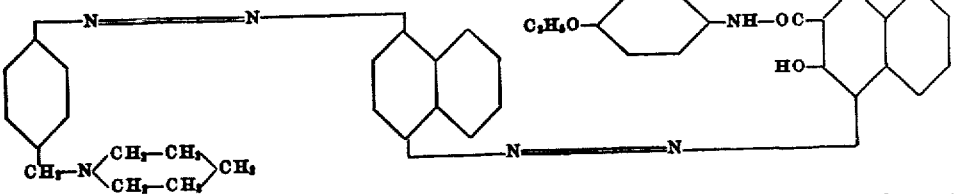

Now what we claim and desire to secure by Letters Patent is the following:

1. As new articles the black azodyestuffs, having probably the general formula:

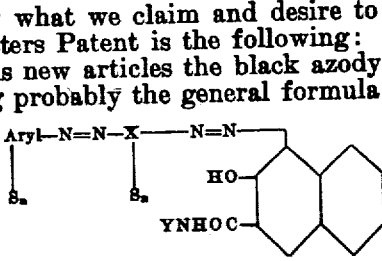

wherein S means a basic group, $n$ the number 0, 1 or 2, but not 0 in both positions simultaneously, X the residue of an 1-naphthylamin compound capable of combining in the 4-position and not containing a sulfo group, Y an aromatic radical, which are when dry black powders, yielding upon reduction with stannous chlorid an arylamin containing 0 to 2 basic groups in lateral chains, an 1.4-diaminocompound of the naphthalene series containing 0 to 2 basic groups in lateral chains and an arylid of 1-amino-2-hydroxy-3-naphthoic acid, said dyestuffs, when mixed with the usual substrata, producing black color lakes and, when produced on the fiber, dyeing cotton in black shades of an excellent fastness.

2. A process of making black azodyestuffs consisting in combining unsulfonated arylazo-1-naphthylamin bodies containing basic groups with arylamids of 2.3-hydroxynaphthoic acid.

3. Materials dyed with the new azodyestuffs according to claim 1, said dyestuffs being developed on the fiber of the material.

4. As new articles the black azodyestuffs, having probably the general formula:

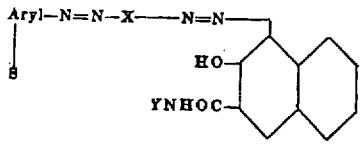

wherein S means a basic group, X the residue of an 1-naphthylamin compound capable of combining in the 4-position and not containing a sulfo group, Y an aromatic radical, which are when dry black powders, yielding upon reduction with stannous chlorid an arylamin containing a basic group in a lateral chain, an 1.4-diaminocompound of the naphthalene series and an arylid of 1-amino-2-hydroxy-3-naphthoic acid, said dyestuffs, when mixed with the usual substrata, producing black color lakes and, when produced on the fiber, dyeing cotton in black shades of an excellent fastness.

5. A process of making black azodyestuffs consisting in combining unsulfonated arylazo-1-naphthylamin bodies containing in the aryl residue a basic group in a lateral chain, with arylamids of 2.3 hydroxynaphthoic acid.

6. Materials dyed with the new azodyestuffs according to claim 4, said dyestuffs being developed on the fiber of the material.

7. As new articles the black azodyestuffs, having probably the general formula:

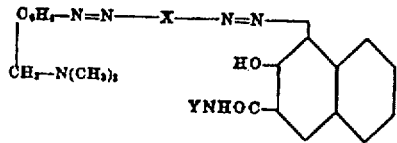

wherein X means the residue of an 1-naphthylamin compound capable of combining in the 4-position and not containing a sulfo group, Y an aromatic radical, which are when dry black powders, yielding upon reduction with stannous chlorid aminobenzyldimethylamin, an 1.4-diaminocompound of the naphthalene series and an arylid of 1-amino-2-hydroxy-3-naphthoic acid, said dyestuffs, when mixed with the usual substrata, producing black color lakes and, when produced on the fiber, dyeing cotton in black shades of an excellent fastness.

8. A process of making black azodyestuffs consisting in combining unsulfonated benzyldimenthylaminazo-1-naphthylamin bodies with arylamids of 2.3-hydroxynaphthoic acid.

9. Materials dyed with the new azodyestuffs according to claim 7, said dyestuffs being developed on the fiber of the material.

10. As new articles the black azodyestuffs, having probably the general formula:

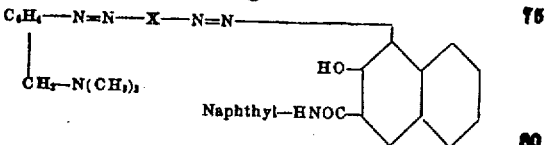

wherein X means the residue of an 1-naphthylamin compound capable of combining in the 4-position and not containing a sulfo group, which are when dry black powders, yielding upon reduction with stannous chlorid aminobenzyldimethylamin, an 1.4-diaminocompound of the naphthalene series and a naphthalid of 1-amino-2-hydroxy-3-naphthoic acid, said dyestuffs, when mixed with the usual substrata, producing black color lakes and, when produced on the fiber, dyeing cotton in black shades of an excellent fastness.

11. A process of making black azodyestuffs consisting in combining unsulfonated benzyldimethylamin-azo - 1 - naphthylamin bodies with naphthalids of 2.3-hydroxynaphthoic acid.

12. Materials dyed with the new azodyestuffs according to claim 10, said dyestuffs being developed on the fiber of the material.

In testimony, that we claim the foregoing as our invention, we have signed our names, this 13th day of March, 1924.

AUGUST LEOPOLD LASKA.
ARTHUR ZITSCHER.

strata, producing black color lakes and, when produced on the fiber, dyeing cotton in black shades of an excellent fastness.

2. A process of making black azodyestuffs consisting in combining unsulfonated aryl-azo-1-naphthylamin bodies containing basic groups with arylamids of 2.3-hydroxynaphthoic acid.

3. Materials dyed with the new azodyestuffs according to claim 1, said dyestuffs being developed on the fiber of the material.

4. As new articles the black azodyestuffs, having probably the general formula:

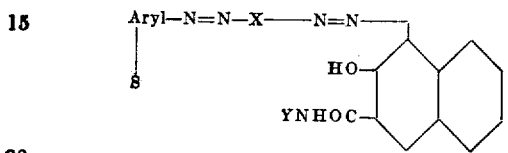

wherein S means a basic group, X the residue of an 1-naphthylamin compound capable of combining in the 4-position and not containing a sulfo group, Y an aromatic radical, which are when dry black powders, yielding upon reduction with stannous chlorid an arylamin containing a basic group in a lateral chain, an 1.4-diaminocompound of the naphthalene series and an arylid of 1-amino-2-hydroxy-3-naphthoic acid, said dyestuffs, when mixed with the usual substrata, producing black color lakes and, when produced on the fiber, dyeing cotton in black shades of an excellent fastness.

5. A process of making black azodyestuffs consisting in combining unsulfonated aryl-azo-1-naphthylamin bodies containing in the aryl residue a basic group in a lateral chain, with arylamids of 2.3 hydroxynaphthoic acid.

6. Materials dyed with the new azodyestuffs according to claim 4, said dyestuffs being developed on the fiber of the material.

7. As new articles the black azodyestuffs, having probably the general formula:

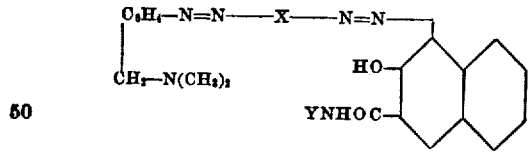

wherein X means the residue of an 1-naphthylamin compound capable of combining in the 4-position and not containing a sulfo group, Y an aromatic radical, which are when dry black powders, yielding upon reduction with stannous chlorid aminobenzyldimethylamin, an 1.4-diaminocompound of the naphthalene series and an arylid of 1-amino-2-hydroxy-3-naphthoic acid, said dyestuffs, when mixed with the usual substrata, producing black color lakes and, when produced on the fiber, dyeing cotton in black shades of an excellent fastness.

8. A process of making black azodyestuffs consisting in combining unsulfonated benzyldimenthylaminazo-1-naphthylamin bodies with arylamids of 2.3-hydroxynaphthoic acid.

9. Materials dyed with the new azodyestuffs according to claim 7, said dyestuffs being developed on the fiber of the material.

10. As new articles the black azodyestuffs, having probably the general formula:

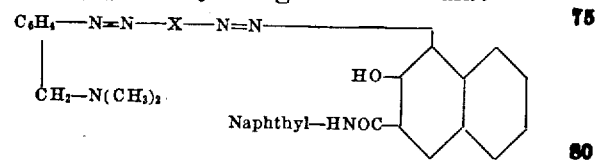

wherein X means the residue of an 1-naphthylamin compound capable of combining in the 4-position and not containing a sulfo group, which are when dry black powders, yielding upon reduction with stannous chlorid aminobenzyldimethylamin, an 1.4-diaminocompound of the naphthalene series and a naphthalid of 1-amino-2-hydroxy-3-naphthoic acid, said dyestuffs, when mixed with the usual substrata, producing black color lakes and, when produced on the fiber, dyeing cotton in black shades of an excellent fastness.

11. A process of making black azodyestuffs consisting in combining unsulfonated benzyldimethylamin-azo - 1 - naphthylamin bodies with naphthalids of 2.3-hydroxynaphthoic acid.

12. Materials dyed with the new azodyestuffs according to claim 10, said dyestuffs being developed on the fiber of the material.

In testimony, that we claim the foregoing as our invention, we have signed our names, this 13th day of March, 1924.

AUGUST LEOPOLD LASKA.
ARTHUR ZITSCHER.

Certificate of Correction.

It is hereby certified that Letters Patent No. 1,592,604, granted July 13, 1926, upon the application of August Leopold Laska and Arthur Zitscher, of Offenbach-on-the-Main, Germany, for an improvement in "Black Disazo Cotton Dyes," were erroneously issued to the "Corporation of Chemische Fabrik Griesheim-Electron, of Frankfort-on-the-Main," whereas said Letters Patent should have been issued to *I. G. Farbenindustrie Aktiengesellschaft, Frankfort-on-the-Main, Germany*, as shown by the records of assignments in this office; and that the said Letters Patent should be read with this correction therein that the same may conform to the record of the case in the Patent Office.

Signed and sealed this 19th day of October, A. D. 1926.

[SEAL.]

WM. A. KINNAN,
*Acting Commissioner of Patents.*

Certificate of Correction.

It is hereby certified that Letters Patent No. 1,592,604, granted July 13, 1926, upon the application of August Leopold Laska and Arthur Zitscher, of Offenbach-on-the-Main, Germany, for an improvement in "Black Disazo Cotton Dyes," were erroneously issued to the "Corporation of Chemische Fabrik Griesheim-Electron, of Frankfort-on-the-Main," whereas said Letters Patent should have been issued to *I. G. Farbenindustrie Aktiengesellschaft, Frankfort-on-the-Main, Germany*, as shown by the records of assignments in this office; and that the said Letters Patent should be read with this correction therein that the same may conform to the record of the case in the Patent Office.

Signed and sealed this 19th day of October, A. D. 1926.

[SEAL.]
WM. A. KINNAN,
*Acting Commissioner of Patents*